US012665431B2

(12) United States Patent　　　　　(10) Patent No.: US 12,665,431 B2

Xu et al.　　　　　　　　　　　　　(45) Date of Patent:　　Jun. 23, 2026

(54) CONTROL METHOD AND DISTRIBUTED POWER SYSTEM

(71) Applicant: Huawei Digital Power Technologies Co., Ltd., Futian District (CN)

(72) Inventors: Zhiwu Xu, Shenzhen (CN); Lin Li, Shanghai (CN); Guowei Guo, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 287 days.

(21) Appl. No.: 18/229,289

(22) Filed: Aug. 2, 2023

(65) Prior Publication Data

US 2023/0378764 A1　　Nov. 23, 2023

Related U.S. Application Data

(63) Continuation of application No. PCT/CN2021/075241, filed on Feb. 4, 2021.

(51) Int. Cl.
| | |
|---|---|
| *H02J 3/38* | (2026.01) |
| *H02J 3/388* | (2026.01) |
| *H02M 1/32* | (2007.01) |
| *H02M 1/36* | (2007.01) |
| *H02M 7/44* | (2006.01) |

(52) U.S. Cl.
CPC .............. *H02J 3/388* (2020.01); *H02M 1/32* (2013.01); *H02M 1/36* (2013.01); *H02M 7/44* (2013.01)

(58) Field of Classification Search
CPC ............ H02J 3/381; H02J 3/388; H02M 1/32; H02M 1/36; H02M 7/44
USPC ........................................ 700/286
See application file for complete search history.

(56) References Cited

U.S. PATENT DOCUMENTS

| | | | | |
|---|---|---|---|---|
| 5,563,777 | A | * 10/1996 | Miki | ................. H02M 7/53832 |
| | | | | 363/124 |
| 9,124,095 | B1 * | 9/2015 | Barron | ................... G01R 19/00 |
| 2003/0080741 | A1 | 5/2003 | Lerow et al. | |
| 2017/0018929 | A1 * | 1/2017 | Majumder | ............. H02J 3/381 |

(Continued)

FOREIGN PATENT DOCUMENTS

| | | |
|---|---|---|
| CN | 104393591 A | 3/2015 |
| CN | 105490513 A | 4/2016 |
| CN | 107907763 A | 4/2018 |

(Continued)

*Primary Examiner* — Chun Cao

(74) *Attorney, Agent, or Firm* — WOMBLE BOND DICKINSON (US) LLP

(57) ABSTRACT

Embodiments of this application relate to the field of control technologies, and provide a control method and a distributed power system. The method includes: controlling an inverter to work in a current source mode, where the current source mode means that the inverter serves as a current source to convert a direct current generated by a power supply device into an alternating current and output the alternating current to the alternating current grid; and controlling the inverter to switch from the current source mode to a voltage source mode when it is detected that a voltage at a first target port jumps. In this way, an output voltage of the inverter may be controlled within a safety range, so that a local load can be protected before a cause of an abnormal voltage is detected, and comparatively, power may be continuously supplied to the local load.

20 Claims, 10 Drawing Sheets

(56) References Cited

U.S. PATENT DOCUMENTS

2020/0373830 A1* 11/2020 Yu .......................... H02M 1/32

FOREIGN PATENT DOCUMENTS

| CN | 108565895 A | 9/2018 |
| CN | 110021959 A | 7/2019 |
| CN | 110824272 A | 2/2020 |

* cited by examiner

Voltage at a first target port

A voltage reference value obtained by adding negative disturbance

A phase locked loop tracks a phase of the voltage reference value through frequency modulation

CONTROL METHOD AND DISTRIBUTED POWER SYSTEM

CROSS-REFERENCE TO RELATED APPLICATIONS

This application is a continuation of International Application No. PCT/CN2021/075241, filed on Feb. 4 2021, the disclosure of which is hereby incorporated by reference in its entirety.

TECHNICAL FIELD

This application relates to the field of control technologies, and in particular, to a control method and a distributed power system.

BACKGROUND

As an apparatus for energy exchange between a renewable energy and a grid, an inverter has been widely used in a distributed power system for new energy, including wind power generation, photovoltaic power generation, wave power generation, and the like. The distributed power system usually includes a new energy power generation apparatus, an inverter, a local load, and a grid. The inverter and the grid supply power to the local load together. When the inverter is in a grid-connected mode, the inverter serves as a current source to control power of a current input into the grid. When the grid is disconnected from the inverter due to a fault or line cutting, the inverter is connected to the local load. Without support of a voltage and a frequency that are of the grid, an output voltage of the inverter may be much higher than a rated voltage, causing damage to the local load and other problems. Therefore, when the voltage at an output port of the inverter rises to be excessively high, the voltage at the output port of the inverter needs to be controlled to improve system safety.

At present, a common control method is an active control method. For example, a voltage amplitude at the output port of the inverter is detected; and when the voltage amplitude exceeds a preset threshold, the inverter triggers protection and is shut down.

However, in the foregoing control method, comparatively, power cannot be continuously supplied to the local load.

SUMMARY

Embodiments of this application provide a control method and a distributed power system. When it is determined that a voltage is abnormal, a working mode of an inverter is adjusted, so that an output voltage of the inverter may be controlled within a safety range, so that a local load can be protected before a cause of an abnormal voltage is detected, and comparatively, power may be continuously supplied to the local load.

According to a first aspect, an embodiment of this application provides a control method, applied to a distributed power system. The distributed power system includes a plurality of distributed power supply units, and all the plurality of distributed power supply units are connected to an alternating current grid. Each of the distributed power supply units includes an inverter configured to connect to a power supply device, an input end of the inverter is connected to the power supply device, and an output end of the inverter is connected to the alternating current grid. The method includes: controlling the inverter to work in a current source mode, where the current source mode means that the inverter serves as a current source to convert a direct current generated by the power supply device into an alternating current and output the alternating current to the alternating current grid; and controlling the inverter to switch from the current source mode to a voltage source mode when it is detected that a voltage at a first target port jumps, wherein the first target port is any of the ports over which the inverter is connected to the alternating current grid; and that the voltage jumps means that a change of the voltage at the first target port within first duration is greater than a preset value, and the voltage source mode means that the inverter serves as a voltage source to output a voltage.

In this way, in a process in which the inverter serves as the current source to supply power to an alternating current bus, an output voltage of the inverter is detected. If it is detected that the output voltage of the inverter is greater than a threshold and the voltage rises relatively quickly, the inverter switches to the voltage source, and still supplies power to the load, where the voltage of the voltage source is constant, so that the load can be protected, and comparatively, power can be continuously supplied to the load. Further, after the inverter switches to the voltage source, islanding detection is performed on the inverter. The inverter is shut down when it is detected that islanding occurs in the inverter. If no islanding occurs in the inverter, the inverter may switch to the current source to supply power to the alternating current bus, to implement continuous power supply.

In an embodiment, that the voltage jumps means that the voltage at the first target port is greater than a first threshold, and the change of the voltage at the first target port within the first duration is greater than the preset value. In this way, if the voltage at the first target port is less than the first threshold, it indicates that the voltage at the first target port usually does not cause damage to the load, and it may be considered that the voltage at the first target port has not jumped. In this case, the inverter still works in the current source mode, and continuous power supply of the inverter can be implemented.

In an embodiment, after the controlling the inverter to switch from the current source mode to a voltage source mode, the method further includes: performing islanding detection on the inverter; and shutting down the inverter when it is detected that islanding occurs in the inverter. In this way, after the output voltage of the inverter is controlled, islanding detection is performed on the inverter, to determine whether power down of the grid or high voltage ride through of the grid causes the voltage at the first target port to jump. In this way, when the voltage at the first target port jumps, the inverter is relatively well controlled.

In an embodiment, the performing islanding detection on the inverter includes: cyclically performing islanding detection on the inverter when duration in which the inverter is in the voltage source mode is less than a second threshold, where the cyclically performing islanding detection on the inverter means that if it is not detected that islanding occurs in the inverter during islanding detection last time, islanding detection is performed on the inverter again, until it is detected that islanding occurs in the inverter. In this way, islanding detection may be cyclically performed on the inverter within the second threshold, to avoid erroneous determining.

In an embodiment, the performing islanding detection on the inverter includes: tracking a phase change of the voltage at the first target port by using a phase locked loop in the inverter, and injecting positive feedback disturbance into the first target port; and when a frequency of a voltage output by the phase locked loop based on the disturbance is greater than a third threshold, counting once that islanding occurs in the inverter.

In an embodiment, that it is detected that islanding occurs in the inverter includes: if a counted quantity of times islanding occurs in the inverter is greater than a fourth threshold, determining that it is detected that islanding occurs in the inverter. In this way, it can be determined that islanding occurs in the inverter only when it has been determined for a plurality of times that islanding occurs in the inverter, to avoid erroneous determining.

In an embodiment, the method further includes: controlling the inverter to switch from the voltage source mode to the current source mode if the duration in which the inverter is in the voltage source mode is greater than or equal to the second threshold. If the inverter is in the voltage source mode for a relatively long time, and it is still not detected that islanding occurs in the inverter, it indicates that no islanding occurs in the inverter, and the inverter is controlled to switch from the voltage source mode to the current source mode, so that continuous power supply can be implemented.

In an embodiment, the controlling the inverter to switch from the current source mode to a voltage source mode when it is detected that a voltage at a first target port jumps includes: when it is detected that the voltage at the first target port jumps, determining whether an interval between a time point at which the inverter switches to the voltage source mode last time and a time point at which the voltage jumps is greater than a fifth threshold; and controlling the inverter to switch from the current source mode to the voltage source mode if the interval is greater than the fifth threshold. In this way, the inverter can be avoided from frequently switching between the current source mode and the voltage source mode, to ensure normal system operation.

In an embodiment, the method further includes: controlling the inverter to skip power output when the inverter is in the voltage source mode and it is detected that a voltage at a second target port is greater than a sixth threshold, where the second target port is any of the ports over which the inverter is connected to the power supply device. In this way, damage to the inverter caused by an excessively high voltage at the second target port can be avoided.

According to a second aspect, an embodiment of this application provides a distributed power system, including a control apparatus and a plurality of distributed power supply units. All the plurality of distributed power supply units are connected to an alternating current grid. Each of the distributed power supply units includes an inverter configured to connect to a power supply device, an input end of the inverter is connected to the power supply device, and an output end of the inverter is connected to the alternating current grid.

The control apparatus is configured to: control the inverter to work in a current source mode, where the current source mode means that the inverter serves as a current source to convert a direct current generated by the power supply device into an alternating current and output the alternating current to the alternating current grid; and control the inverter to switch from the current source mode to a voltage source mode when it is detected that a voltage at a first target port jumps, wherein the first target port is any of the ports over which the inverter is connected to the alternating current grid; and that the voltage jumps means that a change of the voltage at the first target port within first duration is greater than a preset value, and the voltage source mode means that the inverter serves as a voltage source to output a voltage.

In an embodiment, that the voltage jumps means that the voltage at the first target port is greater than a first threshold, and the change of the voltage at the first target port within the first duration is greater than the preset value.

In an embodiment, the control apparatus is further configured to: perform islanding detection on the inverter; and shut down the inverter when it is detected that islanding occurs in the inverter.

In an embodiment, the control apparatus is configured to cyclically perform islanding detection on the inverter when duration in which the inverter is in the voltage source mode is less than a second threshold, where the cyclically performing islanding detection on the inverter means that if it is not detected that islanding occurs in the inverter during islanding detection last time, islanding detection is performed on the inverter again, until it is detected that islanding occurs in the inverter.

In an embodiment, the control apparatus is configured to: track a phase change of the voltage at the first target port by using a phase locked loop in the inverter, and injecting positive feedback disturbance into the first target port; and when a frequency of a voltage output by the phase locked loop based on the disturbance is greater than a third threshold, count once that islanding occurs in the inverter.

In an embodiment, the control apparatus is configured to: if a counted quantity of times islanding occurs in the inverter is greater than a fourth threshold, determine that it is detected that islanding occurs in the inverter.

In an embodiment, the control apparatus is further configured to control the inverter to switch from the voltage source mode to the current source mode if the duration in which the inverter is in the voltage source mode is greater than or equal to the second threshold.

In an embodiment, the control apparatus is further configured to: when it is detected that the voltage at the first target port jumps, determine whether an interval between a time point at which the inverter switches to the voltage source mode last time and a time point at which the voltage jumps is greater than a fifth threshold; and control the inverter to switch from the current source mode to the voltage source mode if the interval is greater than the fifth threshold.

In an embodiment, the control apparatus is further configured to: control the inverter to skip power output when the inverter is in the voltage source mode and it is detected that a voltage at a second target port is greater than a sixth threshold, where the second target port is a port over which the inverter is connected to the power supply device.

According to a third aspect, an embodiment of this application provides a control apparatus, including a processor, configured to invoke a program in a memory, to implement any control method according to any one of the first aspect or the possible implementations of the first aspect.

According to a fourth aspect, this application provides a chip or a chip system. The chip or the chip system includes at least one processor and a communication interface. The communication interface and the at least one processor are connected to each other through a line. The at least one processor is configured to run a computer program or instructions, to perform any control method according to any implementation of the first aspect.

The communication interface of the chip may be an input/output interface, a pin, a circuit, or the like.

In an embodiment, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

According to a fifth aspect, an embodiment of this application provides a computer-readable storage medium. The computer-readable storage medium stores a computer program or instructions. When the computer program or the instructions is/are run on a computer, the computer is enabled to perform the control method according to any implementation of the first aspect.

According to a sixth aspect, an embodiment of this application provides a computer program product. The program product includes a computer program, and the computer program is stored in a readable storage medium. At least one processor of an electronic device may read the computer program from the readable storage medium, and the at least one processor executes the computer program, to enable the electronic device to perform the control method according to any implementation of the first aspect.

It should be understood that the technical solutions in the second aspect to the sixth aspect of embodiments of this application correspond to the technical solution in the first aspect of embodiments of this application, and similar beneficial effects are achieved according to the aspects and the corresponding feasible implementations. Details are not described again.

DESCRIPTION OF EMBODIMENTS

To clearly describe technical solutions in embodiments of this application, terms such as "first" and "second" are used in embodiments of this application to distinguish between same items or similar items that have basically same functions or effects. For example, a first log and a second log are merely used to distinguish between network logs in different time windows, and are not intended to limit a sequence thereof. One of ordinary skilled in the art can understand that the terms such as "first" and "second" do not limit a quantity, and the terms such as "first" and "second" do not indicate a definite difference.

It should be noted that, in this application, "example", "for example", or the like is used to represent giving an example, an illustration, or a description. Any embodiment or design scheme described as an "example" or with "for example" in this application should not be explained as being more preferred or having more advantages than another embodiment or design scheme. Precisely, use of "example", "for example", or the like is intended to present a relative concept in a manner.

In this application, "at least one" means one or more, and "plurality of" means two or more. "and/or" describes an association relationship between associated objects, and indicates that three relationships may exist. For example, A and/or B may indicate the following three cases: only A exists, both A and B exist, and only B exists, where A and B may be singular or plural.

The technical solutions in embodiments of the present disclosure are described below with reference to the accompanying drawings in embodiments of the present disclosure. Clearly, the described embodiments are merely some of rather than all embodiments of the present disclosure. Based on embodiments of the present disclosure, all other embodiments obtained by One of ordinary skilled in the art without creative efforts shall fall within the protection scope of the present disclosure.

Figure 1:
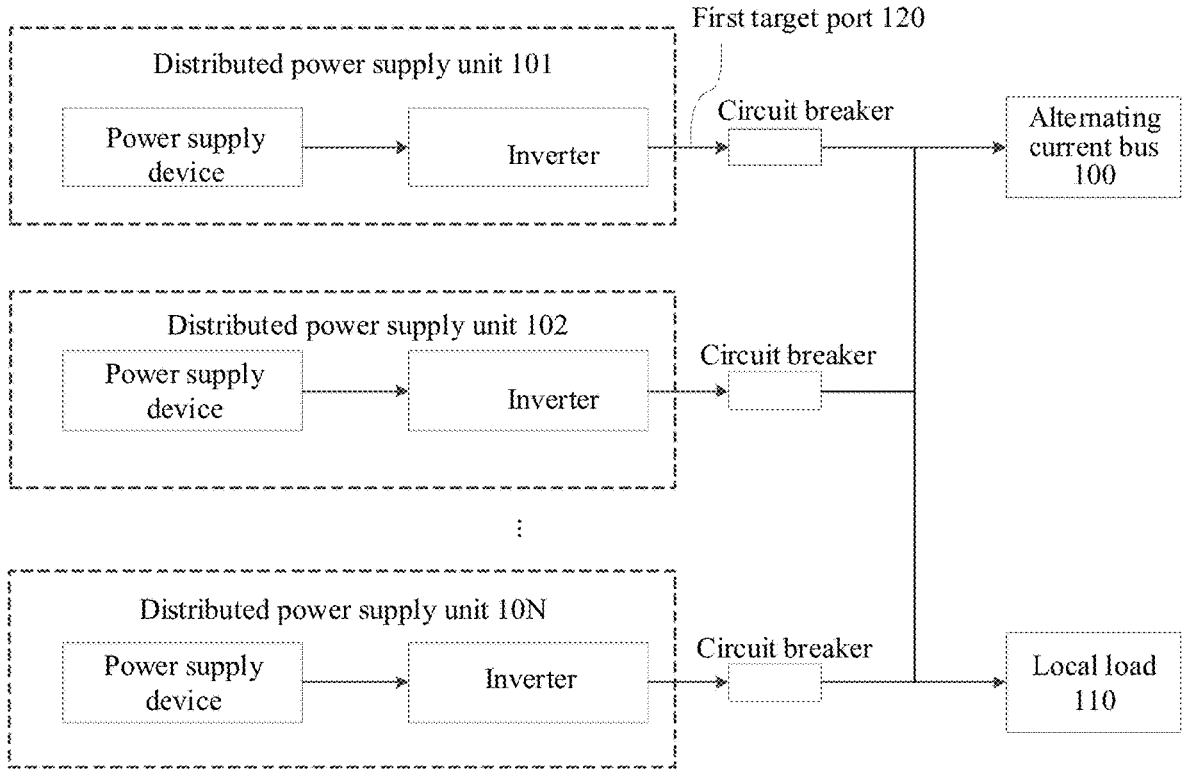
FIG. 1 is a schematic diagram of an architecture of a distributed power system according to an embodiment of this application.

FIG. 1 is a schematic diagram of an architecture of a distributed power system. As shown in FIG. 1, the distributed power system includes a plurality of distributed power supply units, for example, a distributed power supply unit 101 to a distributed power supply unit 10N, where N is a natural number. The plurality of distributed power supply units supply power to an alternating current bus 100 and a local load 110 together.

Each of the distributed power supply units includes an inverter configured to connect to a power supply device. An input end of the inverter is connected to the power supply device, and an output end of the inverter is connected to an alternating current grid.

The power supply device may include a photovoltaic power generation device, a wind power device, an electrical energy storage device, a fuel cell device, a micro combined heat and power device, and/or the like.

Because the power supply device outputs a direct current, and there is an alternating current on the grid, the direct current output by the power supply device cannot be directly fed back to the alternating current grid, and the inverter needs to convert the direct current into an alternating current and then feed back the alternating current to the grid. This process may be referred to as grid-connected power generation.

The inverter may be a power regulation apparatus including a semiconductor switch component, and is mainly configured to convert direct current power into alternating current power. For example, the inverter may include a boost circuit and a bridge inverter circuit. The boost circuit is configured to boost a direct voltage of the power supply device to a direct voltage for output control of the inverter, and the bridge inverter circuit is configured to equivalently convert a boosted direct voltage into an alternating voltage at a commonly used frequency.

As shown in FIG. 1, in an actual operation of the distributed power system, the inverter may be connected to the alternating current grid by using a circuit breaker. When the inverter is in a grid-connected mode, the inverter serves as a current source to control a power of a current input into the alternating current grid. However, in an actual operation, there may be a fault in the distributed power system due to various causes.

Figure 2:
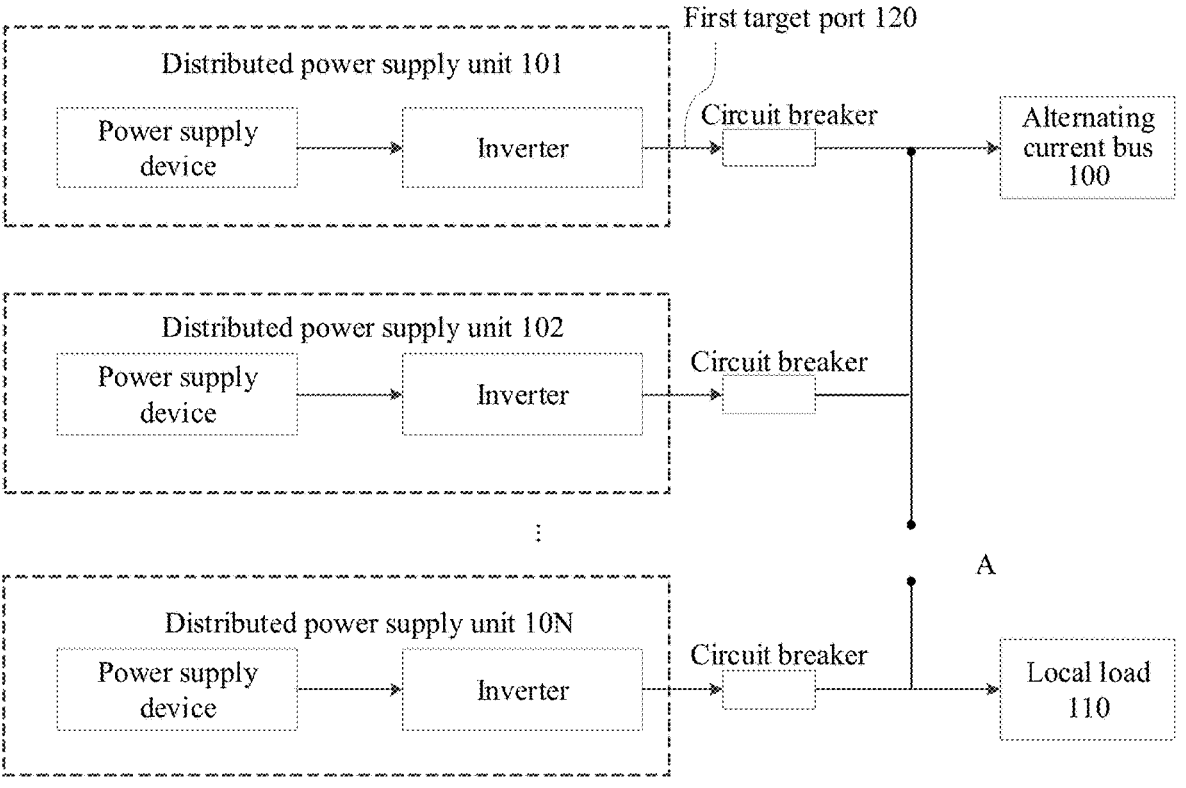
FIG. 2 is a schematic diagram of an architecture of an island system according to an embodiment of this application.

For example, as shown in FIG. 2, a circuit breaker connected to the distributed power supply unit 10N is disconnected from the alternating current bus 100 at a grid-connected point A, and the distributed power supply unit 10N and the local load 110 form an island system. In this case, it can be understood that islanding occurs in an inverter in the distributed power supply unit 10N.

When islanding occurs in the inverter, as an output power of the inverter is usually greater than a power of the load, to balance a power of the inverter that is superfluous for the load, the inverter needs to increase an output voltage to achieve power balance. For example, if the output power of the inverter is 20 kW, and the power of the load is 5 kW, and if the inverter is disconnected from the bus and has islanding, and a power consumed by the load is 5 kW, there still is 15 kW that cannot be output by the inverter. According to a relationship between a power P, a voltage U, and a current I, that is, P=UI, when the inverter serves as the current source, I is constant, and the inverter needs to continuously increase the output voltage U to achieve power balance.

Figure 3:
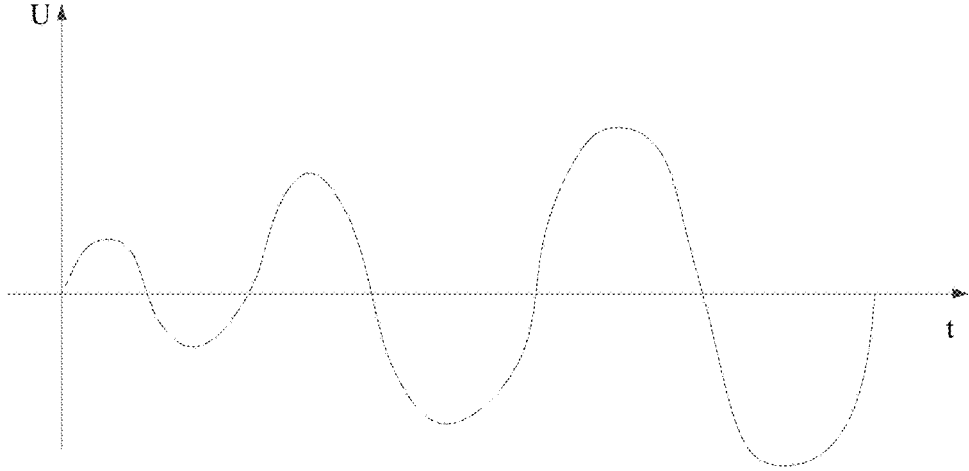
FIG. 3 is a schematic diagram of a voltage at an output port of an inverter that rises to be excessively high according to an embodiment of this application.

For example, FIG. 3 is a schematic diagram of a voltage of an inverter that continuously rises over time when islanding occurs in the inverter. In FIG. 3, a horizontal axis represents time, and a vertical axis represents a voltage amplitude.

It can be understood that, as the output voltage of the inverter continuously rises, the output voltage of the inverter may be far higher than a rated voltage of the load, causing damage to the load.

Therefore, in some standards for grid-connection, it is stipulated that the output voltage at a port of the inverter cannot be greater than a specified value, to ensure safety of the local load device and personnel. When the output voltage of the inverter rises to be excessively high, measures need to be taken to improve system safety.

For example, a voltage amplitude at an output port of the inverter is detected, and when the voltage amplitude exceeds a preset threshold, the inverter triggers protection and is shut down, to avoid a risk caused by the excessively high output voltage of the inverter.

However, in actual application, high voltage ride through (HVRT) may occur in the inverter due to various causes. High voltage ride through may be understood as a phenomenon that a voltage suddenly rises but can be restored to normal in a relatively short time. High voltage ride through usually does not cause damage to the load. However, in an embodiment, whenever the output voltage of the inverter is higher than the threshold, the inverter is shut down. In this case, the inverter is shut down frequently when high voltage ride through occurs some time, and comparatively cannot continuously supply power to the load.

In view of this, embodiments of this application provide a control method and a distributed power system. In a process in which the inverter serves as the current source to supply power to the alternating current bus, the output voltage of the inverter is detected. If it is detected that the output voltage of the inverter is greater than the threshold and the voltage rises relatively quickly, the inverter switches to the voltage source, and still supplies power to the load, where the voltage of the voltage source is constant, so that the load can be protected, and comparatively, power can be continuously supplied to the load. Further, after the inverter switches to the voltage source, islanding detection is performed on the inverter. The inverter is shut down when it is detected that islanding occurs in the inverter. If no islanding occurs in the inverter, the inverter may switch to the current source to supply power to the alternating current bus, to implement continuous power supply.

Figure 4:
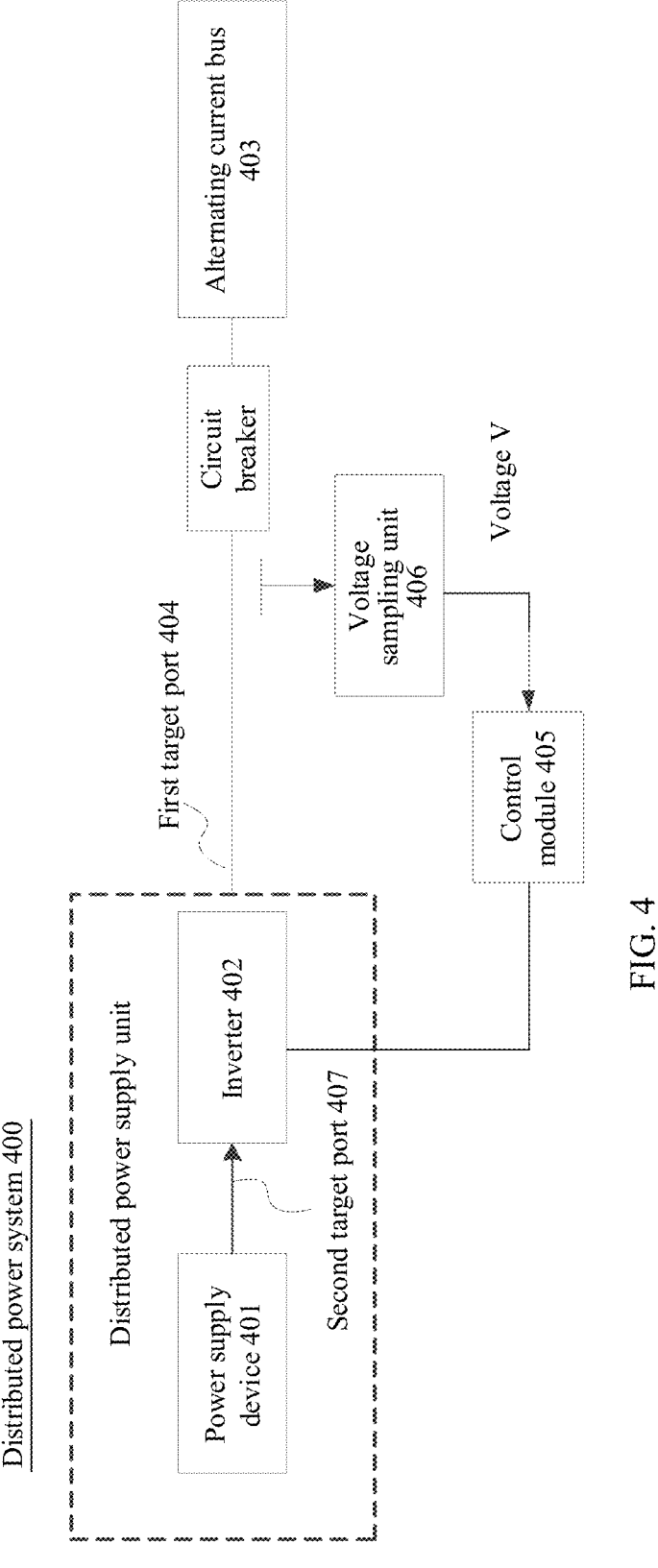
FIG. 4 is a schematic diagram of an architecture of a distributed power system according to an embodiment of this application.

For example, FIG. 4 is a schematic diagram of an architecture of a distributed power system 400 according to an embodiment of this application. As shown in FIG. 4, the distributed power system 400 includes a distributed power supply unit, and the distributed power supply unit is connected to an alternating current bus 403.

In an embodiment, the distributed power supply unit includes an inverter 402 configured to connect to a power supply device 401. An input end of the inverter 402 is connected to the power supply device 401, and an output end of the inverter 402 is connected to an alternating current bus 403 by using a circuit breaker.

The inverter 402 may work in a current source mode or a voltage source mode. That the inverter works in the current source mode may be understood as the inverter converting a direct current generated by the power supply device into an alternating current and then outputting a stabilized current as a current source. That the inverter works in the voltage source mode may be understood as the inverter serving as a voltage source to output a stabilized voltage to the load.

The distributed power system 400 further includes a control module 405. The control module 405 may be implemented by software, hardware, a combination of software and hardware, or the like. In an embodiment, the control module 405 may be disposed in the inverter 402. For example, the control module 405 may be a processor or a chip disposed in the inverter 402. The control module 405 may alternatively be independent of the inverter 402, and the control module 405 controls a working mode of the inverter 402 through communication with the inverter 402.

The distributed power system 400 further includes a voltage sampling unit 406. The voltage sampling unit 406 is configured to sample a voltage at each port. The voltage sampling unit 406 may be disposed in the inverter 402, or may be independent of the inverter 402. This is not limited in an embodiment of the application.

As shown in FIG. 4, the input end of the inverter 402 is connected to the power supply device 401, and the output end of the inverter 402 is connected to the alternating current bus 403 by using the circuit breaker. A first target port 404 is a port over which the inverter 402 is connected to the alternating current bus. The voltage sampling unit 406 may sample a voltage at the first target port 404, and send the sampled voltage at the first target port 404 to the control module 405. The control module 405 may carry out an adaptive control strategy based on the voltage at the first target port 404. For example, when detecting that the voltage at the first target port 404 jumps, the control module 405 may control the inverter 402 to switch from the current source mode to the voltage source mode.

It should be noted that the direct current distributed power system provided in an embodiment of the application is described in FIG. 4 by using an example in which there is a single distributed power supply unit. It can be understood that the distributed power system may include a plurality of distributed power supply units, and each of the distributed power supply units may have an architecture that is the same as or similar to that of the distributed power supply unit shown in FIG. 4.

In a possible way of understanding, the distributed power system includes a hardware system and a software system. The hardware system may include the power supply device, the inverter, and the circuit breaker. The software system may include the control module 405. The hardware system features a high voltage, and the software system features a low voltage. For example, a voltage of the power system may be some hundred volts, and a voltage of a control chip in the control module 405 may be several volts. If the chip in the control module 405 is directly connected to the distributed power system, when there is interference in the power system, there is also strong interference with the chip. Therefore, in an embodiment, the direct current power system may be isolated from the control module 405 by using a coil or a transformer. For example, a digital signal with a high voltage in the power system is transferred to the control module 405, where for example, the high voltage is 100 V, and only a transfer number 100 is transferred to the control module 405. In this way, electric isolation of the hardware system from the software system can be implemented.

Figure 5:
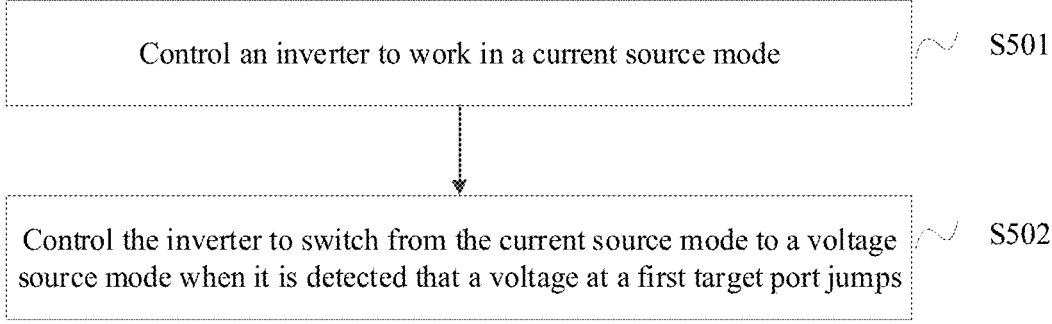
FIG. 5 is a schematic flowchart of a control method according to an embodiment of this application.

A control method according to an embodiment of this application is described with reference to the distributed power system in FIG. 4. FIG. 5 is a schematic flowchart of a control method according to an embodiment of this application. The method is applicable to the control module 405 in the distributed power system corresponding to FIG. 4. The following operations are included.

S501: Control an inverter to work in a current source mode.

During normal power supply, a control module may control the inverter to work in the current source mode, and the inverter serves as a current source to convert a direct current generated by a power supply device into an alternating current and output the alternating current to an alternating current grid, to supply a stabilized current to the alternating current grid and a load.

It can be understood that, when the inverter works in the current source mode, the inverter may output a stabilized current that has a same frequency and a same phase as the alternating current grid, and voltages at an input port and am output port of the inverter may vary. S502: Control the inverter to switch from the current source mode to a voltage source mode when it is detected that a voltage at a first target port jumps.

In an embodiment of the application, the first target port is a port over which any inverter is connected to the alternating current grid. The distributed power supply unit in FIG. 4 is used as an example. A port over which the inverter 402 is connected to the alternating current bus 403 is the first target port 404.

In an embodiment of the application, the control module may sample the voltage at the first target port by using a voltage sampling unit. In an embodiment, when a change of the voltage at the first target port within first duration is greater than a preset value, it may be determined that the voltage at the first target port jumps. The change of the voltage within the first duration may be understood as a jump value of the voltage within a period of time. Values of the first duration and the preset value may be set based on an actual application scenario, and are not limited.

In an embodiment, alternatively, when the voltage at the first target port is greater than a first threshold, and the change of the voltage within the first duration is greater than the preset value, it may be determined that the voltage at the first target port jumps. The first threshold may be set based on an actual application scenario. This is not limited in an embodiment of the application. For example, the first threshold may be about 120% of a rated voltage of the load.

For example, when detecting whether the voltage at the first target port jumps, the control module may first detect whether the voltage at the first target port is greater than the first threshold. If the voltage at the first target port is less than the first threshold, it indicates that the voltage at the first target port usually does not cause damage to the load, and it may be considered that the voltage at the first target port has not jumped. In this case, the inverter still works in the current source mode. If the voltage at the first target port is greater than the first threshold, it is further detected whether the change of the voltage within the first duration is greater than the preset value. If the change of the voltage within the first duration is greater than the preset value, it may be considered that the voltage at the first target port jumps, and the inverter is controlled to switch from the current source mode to the voltage source mode.

Figure 6:
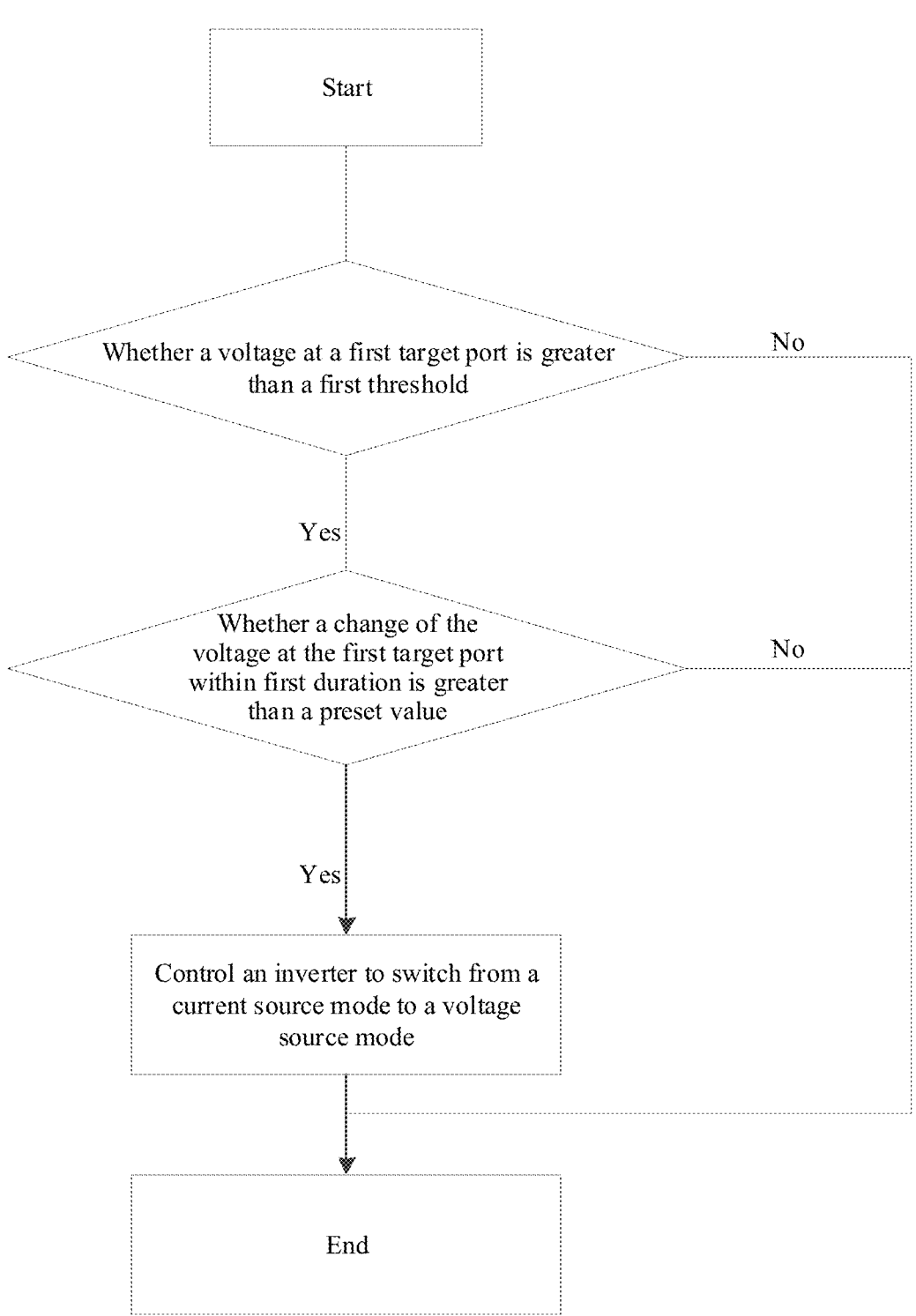
FIG. 6 is a schematic flowchart of detecting whether a voltage at a first target port jumps according to an embodiment of this application.

For example, FIG. 6 is a schematic flowchart of detecting whether the voltage at the first target port jumps according to an embodiment of this application. As shown in FIG. 6, whether the voltage at the first target port is greater than the first threshold is determined. When the voltage at the first target port is greater than the first threshold, whether the change of the voltage at the first target port within the first duration is greater than the preset value is determined. If the voltage at the first target port is greater than the first threshold, and the change of the voltage within the first duration is greater than the preset value, it may be detected that the voltage at the first target port jumps, and therefore the inverter is controlled to switch from the current source mode to the voltage source mode.

It can be understood that there may be signal or noise interference in a process of sampling the voltage at the first target port and determining whether the voltage jumps. In this case, when it is detected only that the voltage at the first target port is greater than the first threshold, it is determined that the voltage at the first target port jumps. This may cause erroneous determining. Therefore, to avoid erroneous determining, when the voltage at the first target port is greater than the first threshold, and the change of the voltage within the first duration is greater than the preset value, it may be detected that the voltage at the first target port jumps.

Power down of the grid or high voltage ride through of the grid may have caused the voltage at the first target port to jump. When a reason for the voltage at the first target port to jump cannot be determined, to prevent the load from being damaged due to an excessively high voltage at the first target port, after it is detected that the voltage at the first target port jumps, the inverter may be controlled to switch from the current source mode to the voltage source mode.

When the inverter works in the voltage source mode, the inverter outputs a stabilized voltage. In this way, the voltage at the first target port does not continue to rise, and the voltage at the first target port may be controlled within a safety range. Therefore, before the reason for the abnormal voltage is detected, the local load can be protected, and comparatively, power may be continuously supplied to the local load.

In conclusion, in an embodiment of the application, when it is detected that a voltage at a port over which any inverter is connected to the alternating current grid jumps, the inverter that originally works in the current source mode is controlled to switch to the voltage source mode, and the inverter serves as a voltage source to output a voltage. In this way, when it is determined that the voltage at the port of the inverter is abnormal, the working mode of the inverter is adjusted, so that an output voltage of the inverter may be controlled within a safety range, so that the load can be protected before a cause of the abnormal voltage is detected, and comparatively, power may be continuously supplied to the local load, and deficiency of power generation is not caused.

Based on the embodiment corresponding to FIG. 5, in an embodiment, S502 includes: When it is detected that the voltage at the first target port jumps, determine whether an interval between a time point at which the inverter switches to the voltage source mode last time and a time point at which the voltage jumps is greater than a fifth threshold; and control the inverter to switch from the current source mode to the voltage source mode if the interval is greater than the fifth threshold.

If the interval between the time point at which the inverter switches to the voltage source mode last time and the time point at which the voltage jumps is less than or equal to the fifth threshold, it can be understood that when the inverter switches to the voltage source mode last time, no power down of the grid is detected, and the distributed power system runs normally. Therefore, the inverter may not need to switch from the current source mode to the voltage source mode, to avoid damage to the inverter caused by frequently switching the working mode of the inverter.

For example, if the time point at which the inverter switches to the voltage source mode last time is 10:25:18, and it is detected that the time point at which the voltage at the first target port jumps is 10:25:19, the interval between the time point at which the inverter switches to the voltage source mode last time and the time point at which the voltage jumps is 1 second. If the fifth threshold is 100 milliseconds, the interval is greater than the fifth threshold, and the inverter may be controlled to switch from the current source mode to the voltage source mode.

For example, if the time point at which the inverter switches to the voltage source mode last time is 12:04:18, and it is detected that the time point at which the voltage at the first target port jumps is 12:04:19, the interval between the time point at which the inverter switches to the voltage source mode last time and the time point at which the voltage jumps is 1 second. If the fifth threshold is 200 milliseconds, the interval is less than the fifth threshold, and the inverter may not be controlled to switch from the current source mode to the voltage source mode.

In an embodiment of the application, a value of the fifth threshold may be set based on an actual situation. This is not limited in an embodiment of the application.

In an embodiment of the application, when the interval between the time point at which the inverter switches to the voltage source mode last time and the time point at which the voltage jumps is greater than the fifth threshold, the inverter is controlled to switch from the current source mode to the voltage source mode. In this way, frequent switching of the inverter between the current source mode and the voltage source mode can be avoided, and the system can be ensured to run normally.

Based on the embodiment corresponding to FIG. 5, after it is detected that the voltage at the first target port jumps and the inverter is controlled to switch from the current source mode to the voltage source mode, the reason for the voltage at the first target port to jump may be further determined, so that the inverter can be controlled based on the reason of jumping, to better protect the system. For example, after the inverter is controlled to switch from the current source mode to the voltage source mode, the control method provided in an embodiment of the application further includes: performing islanding detection on the inverter whose voltage jumps, to determine the cause due to which the voltage at the first target port jumps.

In an embodiment, after S502, the method may further include:

S503 (not shown in the figure): Perform islanding detection on the inverter.

S504 (not shown in the figure): Shut down the inverter when it is detected that islanding occurs in the inverter.

For example, islanding detection may be performed on the inverter in the following several manners:

Manner 1: Whether islanding occurs in the direct current distributed power system is determined by detecting a deviation value of a voltage at an output port of a power supply device. If no islanding occurs, the inverter in a distributed power supply unit is further connected to an alternating current bus. Because the alternating current bus has a strong voltage supporting capability, the voltage at the port of the power supply device remains in a relatively small range close to a rated working voltage of the system. If islanding occurs, the inverter is disconnected from the alternating current bus and loses the voltage supporting capability of the big grid. In this case, when an electric quantity from the power supply device is greater than an electric quantity consumed by the local load, the system voltage gradually increases; or when an electric quantity from the power supply device is less than the electric quantity consumed by the local load, the system voltage gradually decreases. Therefore, when the system voltage exceeds a preset upper limit value or lower limit value, it may be determined that the system has lost support of the big grid, and islanding occurs in the inverter.

Manner 2: Current disturbance is injected into an output current by using the power supply device, a system equivalent impedance is calculated based on fluctuation of a voltage of the alternating current bus and the disturbance current, and islanding is detected based on a difference between the system equivalent impedance in a grid-connected mode and the system equivalent impedance in an islanding mode. For example, when the system is in the grid-connected mode, the inverter keeps connected to the alternating current bus, and the system impedance includes an alternating current bus-side impedance and a local load impedance. Because the alternating current bus-side impedance and the local load impedance are in parallel, and an amplitude of the alternating current bus-side impedance is very small, the total system equivalent impedance is relatively small. When the inverter is in the islanding mode, the power supply device is disconnected from the alternating current bus. Because there is no parallel effect of the alternating current bus-side impedance, the equivalent impedance is relatively large. Therefore, when the system equivalent impedance is relatively large, it may be determined that islanding occurs in the inverter.

Manner 3: Islanding detection is performed by using a phase locked loop (PLL) in the inverter.

Figure 7:
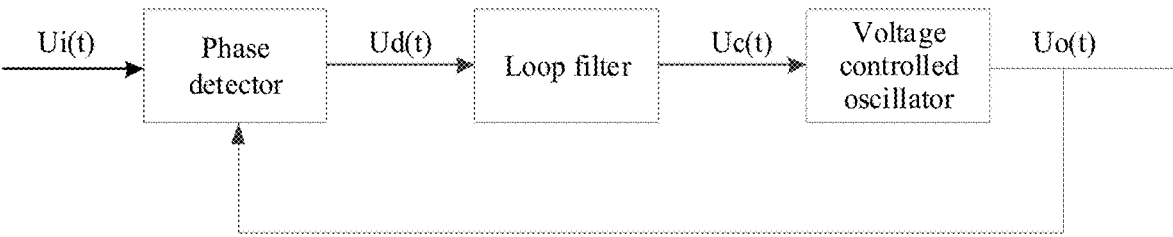
FIG. 7 is a schematic diagram of an architecture of a phase locked loop according to an embodiment of this application.

The phase locked loop can quickly and accurately detect a grid signal and track a frequency and a phase that are of the grid signal. For example, FIG. 7 is a schematic diagram of an architecture of a phase locked loop. As shown in FIG. 7, the phase locked loop includes a phase detector (PD), a loop filter (LF), and a voltage controlled oscillator (VCO).

The phase detector is configured to: detect a phase difference between an input signal Ui and an output signal Uo, and output an error voltage Ud. A function of the loop filter is to filter out a high-frequency component and noise in the error voltage Ud to obtain a control voltage Uc of the voltage controlled oscillator. With Uc, the voltage controlled oscillator pulls a frequency fo of the output signal Uo to a frequency fi of the loop input signal Ui. When fo is equal to fi, a loop is locked. When the loop is already in a locked state, if a frequency and a phase that are of an input reference signal change, a frequency and a phase that are of the voltage controlled oscillator can vary as the voltage controlled oscillator continuously track the change of the frequency of the input reference signal by using a control function of the loop, so that the loop enters the locked state again.

In an embodiment of the application, a phase change of the voltage at the first target port may be tracked by using the phase locked loop in the inverter, and positive feedback disturbance is injected into the first target port. When a frequency of a voltage output by the phase locked loop based on the disturbance is greater than a third threshold, it is counted once that islanding occurs in the inverter. If a counted quantity of times islanding occurs in the inverter is greater than a fourth threshold, determining that it is detected that islanding occurs in the inverter.

In a possible way of understanding, when the inverter works in the voltage source mode, if no islanding occurs in the inverter, it indicates that the inverter is not disconnected from the alternating current grid. In this case, a frequency of an output voltage at the first target port is clamped by the grid, and a case in which the frequency is greater than the third threshold does not occur.

After the positive feedback phase disturbance is injected into the voltage at the first target port, a reference value of the voltage is generated. In this case, the phase locked loop enables an original phase of the voltage at the first target port to track a phase of the reference value of the voltage through frequency modulation. As a result, the frequency of the output voltage at the first target port increasingly becomes larger. When the frequency of the output voltage is greater than the third threshold, it may be determined that islanding occurs in the inverter. The phase disturbance may be a positive value, or may be a negative value.

Figure 8:
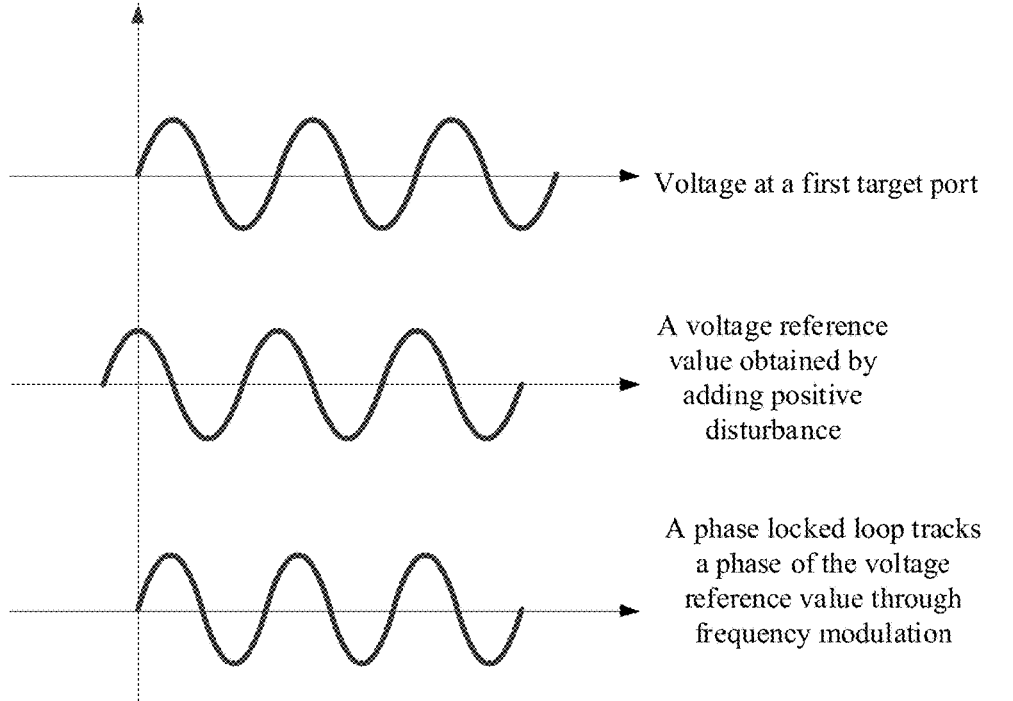
FIG. 8 is a schematic diagram of a phase locked loop tracking a phase by adjusting a frequency according to an embodiment of this application.

In an embodiment, as shown in FIG. 8, when the inverter works in the voltage source mode, if positive phase disturbance is added to the voltage at the first target port, the phase of the obtained reference value of the voltage moves to the left. In this case, the phase locked loop tracks the phase through frequency modulation. If islanding occurs in the inverter, the frequency of the output voltage at the first target port increasingly becomes larger.

Figure 9:
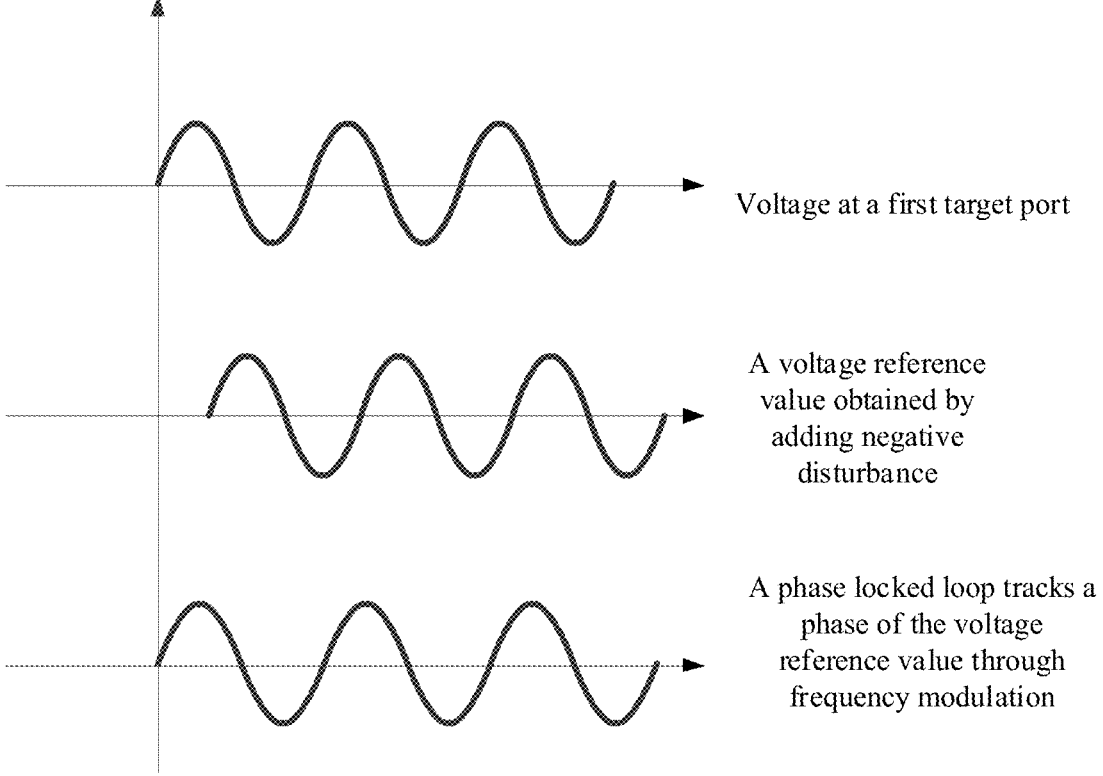
FIG. 9 is a schematic diagram of another phase locked loop tracking a phase by adjusting a frequency according to an embodiment of this application.

In an embodiment, as shown in FIG. 9, when the inverter works in the voltage source mode, if negative phase disturbance is added to the voltage at the first target port, the phase of the obtained reference value of the voltage moves to the right. In this case, the phase locked loop tracks the phase through frequency modulation, causing an increasingly smaller frequency of the output voltage at the first target port. Therefore, when the frequency of the output voltage is less than the preset value, it may be determined that islanding occurs in the inverter.

Figure 10:
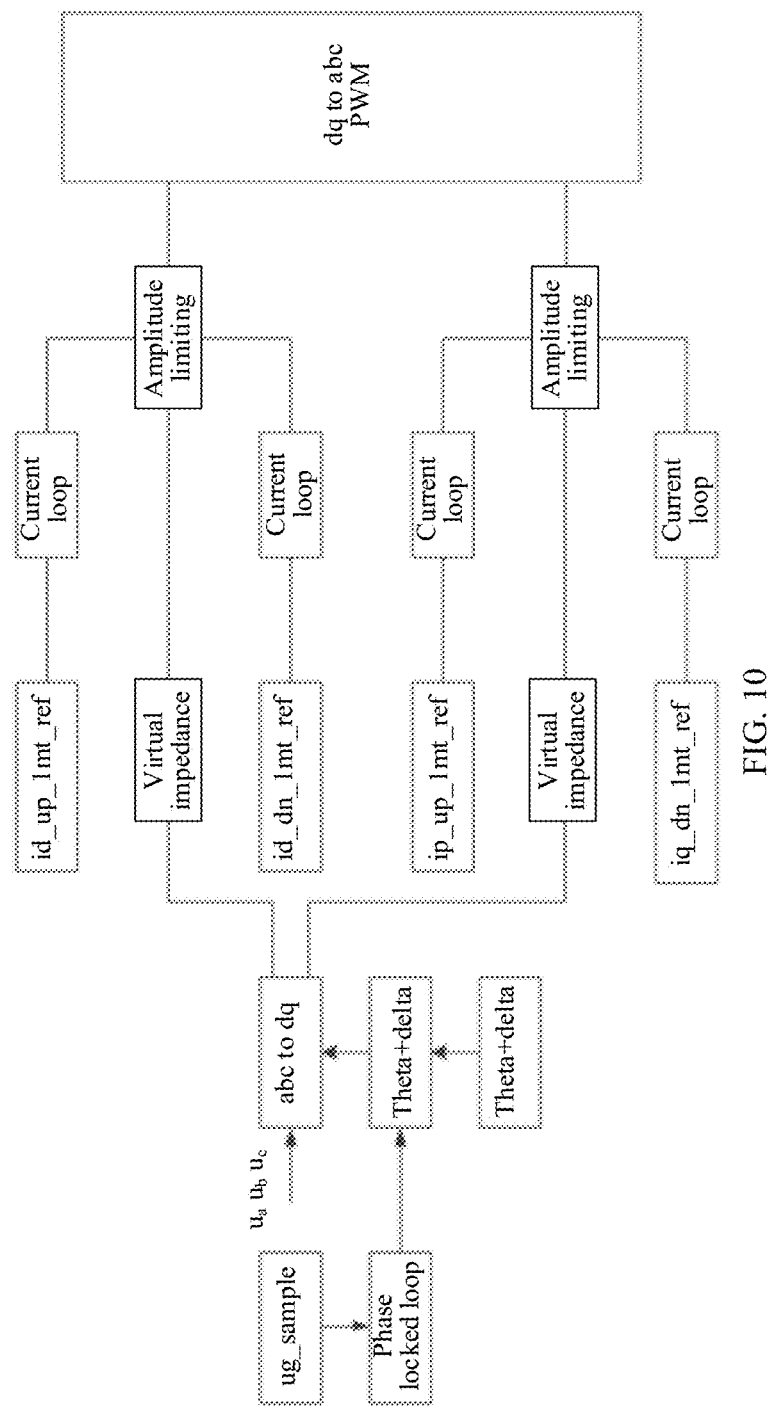
FIG. 10 is a schematic flowchart of obtaining a voltage reference value according to an embodiment of this application.

With reference to FIG. 10, a detailed process in which the phase locked loop works after the positive feedback phase disturbance is injected into the voltage at the first target port is described by using an example.

As shown in FIG. 10, if the positive phase disturbance is added to the voltage at the first target port, the voltage may be analyzed by using a Park's transformation dq coordinate system.

In an embodiment, when it is sampled that the voltage ug-sample at the first target port is greater than the first threshold, a value Theta corresponding to the voltage ug-sample at the first target port is obtained by using the phase locked loop, and a value delta is added to Theta.

Three-phase voltages corresponding to ug-sample in an abc static coordinate system are $u_a$, $u_b$, and $u_c$. Theta plus delta can be used to convert $u_a$, $u_b$, and $u_c$ into two-phase voltages $u_d$ and $u_q$ in the dq coordinate system.

A virtual impedance is added to a voltage control loop of $u_d$ to obtain a voltage amplitude. If the amplitude is relatively large, two current loops may be used to limit the amplitude. To prevent a voltage of the alternating current bus from flowing back to the inverter, current-limiting reference values id-up-lmt-ref and id-dn-lmt-ref of the two current loops may be set to small values. Similarly, a virtual impedance is added to a voltage control loop of $u_q$ to obtain a voltage amplitude. If the amplitude is relatively large, the two current loops may also be used to limit the amplitude. To prevent a voltage of the alternating current bus from flowing back to the inverter, current-limiting reference values id-up-lmt-ref and id-dn-lmt-ref of the two current loops may be set to small values. Then, $u_d$ and $u_q$ with the limited amplitude are converted into three-phase voltages in the abc static coordinate system, and pulse width modulation (PWM) is performed on the inverter based on the three-phase voltages. In this way, the inverter serves as the voltage source and can output a stabilized voltage at the first target port.

In addition, the PWM is performed on the inverter, so that the frequency of the output voltage at the first target port changes. Therefore, when the frequency of the voltage output by the phase locked loop based on the disturbance is greater than the third threshold, it may be counted once that islanding occurs in the inverter. If the counted quantity of times islanding occurs in the inverter is greater than the fourth threshold, it is determined that it is detected that islanding occurs in the inverter, and a semiconductor switch matching a hardware apparatus of the inverter is controlled to drive a signal to control a disconnection of the semiconductor switch in the inverter.

In an embodiment of the application, values of the third threshold and the fourth threshold may be set based on an actual situation. This is not limited in an embodiment of the application.

It can be understood that, when the fourth threshold is set to 0, it can be understood that it is determined that islanding occurs in the inverter when islanding is detected once. In this way, it can be quickly detected that islanding occurs in the inverter. When the fourth threshold is set to a value greater than 0, it can be understood that it is determined that islanding occurs in the inverter only when islanding is detected a plurality of times. In this way, a probability of determining erroneously that islanding occurs in the inverter can be reduced.

In conclusion, in an embodiment of the application, after the inverter is controlled to switch from the current source mode to the voltage source mode, islanding detection is performed on the inverter. The inverter is shut down when it is detected that islanding occurs in the inverter. In this way, after the output voltage of the inverter is controlled, islanding detection is performed on the inverter, to determine whether power down of the grid or high voltage ride through of the grid causes the voltage at the first target port to jump. In this way, when the voltage at the first target port jumps, the inverter is relatively quickly controlled.

In an embodiment, after the inverter is controlled to switch from the current source mode to the voltage source mode, duration in which the inverter is in the voltage source mode may be limited. For example, the duration in which the inverter is in the voltage source mode is limited to be less than a second threshold. Islanding detection is cyclically performed on the inverter when the duration in which the inverter is in the voltage source mode is less than the second threshold. That the islanding detection is cyclically performed on the inverter means that if it is not detected that islanding occurs in the inverter during islanding detection last time, islanding detection is performed on the inverter again, until it is detected that islanding occurs in the inverter.

If the duration in which the inverter is in the voltage source mode is greater than or equal to the second threshold, the inverter is controlled to switch from the voltage source mode to a current source mode. This is because if it is not detected that islanding occurs in the inverter for a relatively long time, it is usually because no islanding occurs in the inverter. The inverter switches from the voltage source to the current source mode, to avoid repeated islanding detection on the inverter when the grid has no power down, thereby ensuring the distributed power system to run normally.

For example, if the second threshold is 200 ms and islanding occurs in the inverter, it may be detected within 40 ms that islanding occurs in the inverter. If it is not detected within 200 ms that islanding occurs in the inverter, it may be determined that the voltage at the first target port jumps not because of power down of the grid. In this case, the inverter switches from the voltage source to the current source mode, to avoid repeated islanding detection on the inverter when the grid has no power down, thereby ensuring the distributed power system to run normally.

It can be understood that a value of the second threshold may be set based on an actual situation. This is not limited in an embodiment of the application.

Figure 11:
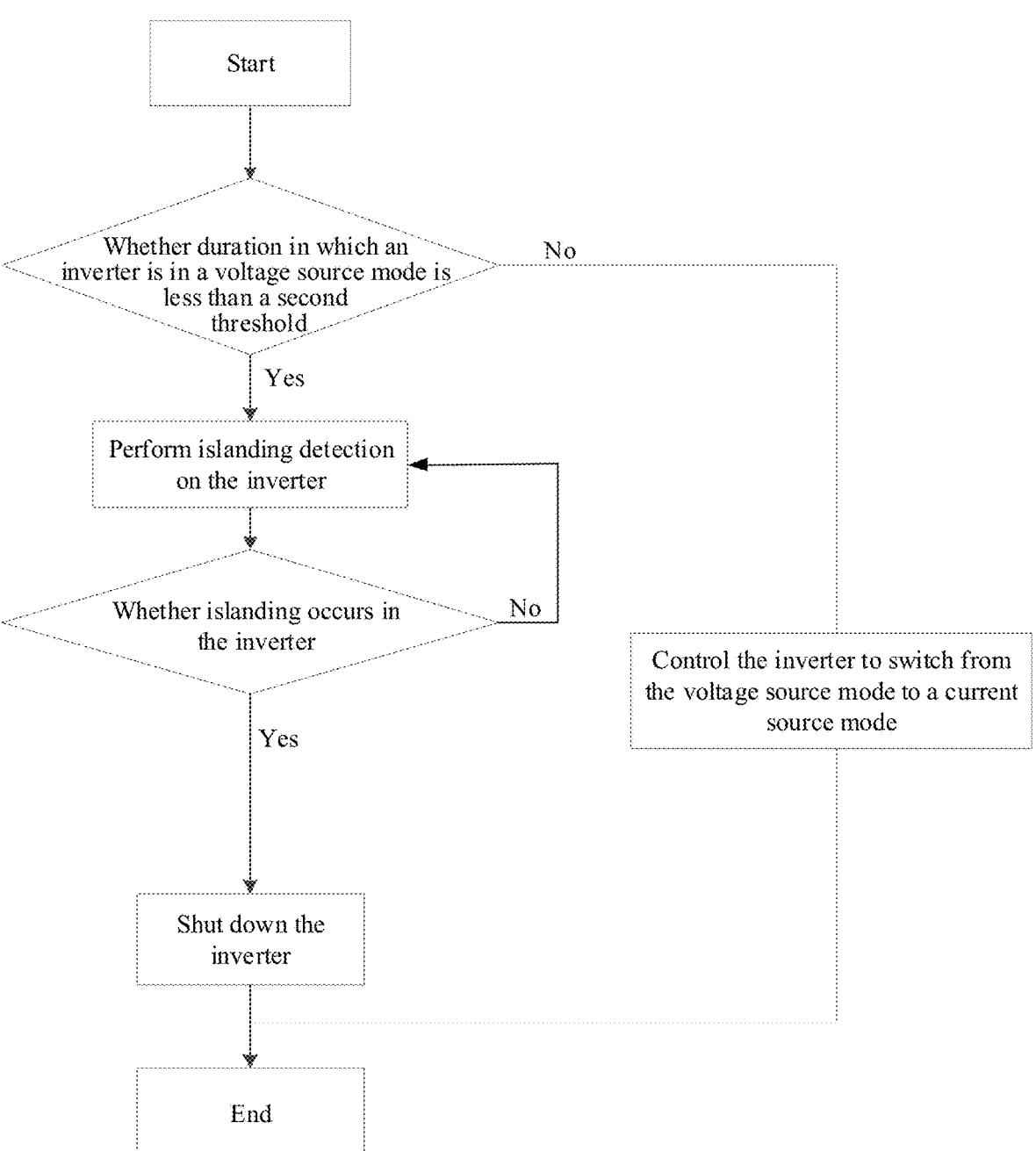
FIG. 11 is a schematic flowchart of a control method according to an embodiment of this application.

For example, FIG. 11 is a schematic flowchart of a control method according to an embodiment of this application. As shown in FIG. 11, islanding detection is cyclically performed on the inverter when duration in which an inverter is in a voltage source mode is less than a second threshold. The inverter is shut down when islanding occurs in the inverter. If the duration in which the inverter is in the voltage source mode is greater than or equal to the second threshold, the inverter is controlled to switch from the voltage source mode to a current source mode.

Based on any one of the foregoing embodiments, in an embodiment, the inverter is controlled to skip power output when the inverter is in the voltage source mode and it is detected that a voltage at a second target port is greater than a sixth threshold.

The second target port is a port over which any inverter is connected to a power supply device. For example, a location of the second target port may correspond to 407 in FIG. 4. In this way, when the voltage at the second target port 407 is greater than the sixth threshold, a fault protection measure may be triggered. If the voltage at the second target port is excessively large, although the inverter works in the voltage source mode and protects a load, a voltage input by the power supply device to the inverter is excessively large. This may cause damage to the inverter. Therefore, a semiconductor switch in the inverter may be controlled to be disconnected, so that the inverter is controlled to skip power output when the inverter is in the voltage source mode and it is detected that the voltage at the second target port is greater than the sixth threshold.

A value of the sixth threshold may be set based on an actual situation. This is not limited in an embodiment of the application. For example, the sixth threshold may be the same as or related to a rated voltage of the inverter.

The method in embodiments of this application is described above with reference to FIG. 4 to FIG. 11. A distributed power system that is provided in embodiments of this application and that is applicable to the foregoing method is described below. The distributed power system includes a plurality of distributed power supply units and a control apparatus. All the plurality of distributed power supply units are connected to an alternating current grid. Each of the distributed power supply units includes an inverter configured to connect to a power supply device. An input end of the inverter is connected to the power supply device, and an output end of the inverter is connected to the alternating current grid.

The control apparatus is configured to: control the inverter to work in a current source mode, where the current source mode means that the inverter serves as a current source to convert a direct current generated by the power supply device into an alternating current and output the alternating current to the alternating current grid; and control the inverter to switch from the current source mode to a voltage source mode when it is detected that a voltage at a first target port jumps, wherein the first target port is any of the ports over which the inverter is connected to the alternating current grid; and that the voltage jumps means that a change of the voltage at the first target port within first duration is greater than a preset value, and the voltage source mode means that the inverter serves as a voltage source to output a voltage.

In an embodiment, the control apparatus is further configured to: perform islanding detection on the inverter; and shut down the inverter when it is detected that islanding occurs in the inverter.

In an embodiment, the control apparatus is configured to cyclically perform islanding detection on the inverter when duration in which the inverter is in the voltage source mode is less than a second threshold, where the cyclically performing islanding detection on the inverter means that if it is not detected that islanding occurs in the inverter during islanding detection last time, islanding detection is performed on the inverter again, until it is detected that islanding occurs in the inverter.

In an embodiment, the control apparatus is configured to: track a phase change of the voltage at the first target port by using a phase locked loop in the inverter, and injecting positive feedback disturbance into the first target port; and when the frequency of the voltage output by the phase locked loop based on the disturbance is greater than a third threshold, count once that islanding occurs in the inverter.

In an embodiment, the control apparatus is configured to: if a counted quantity of times islanding occurs in the inverter is greater than a fourth threshold, determine that it is detected that islanding occurs in the inverter.

In an embodiment, the control apparatus is further configured to control the inverter to switch from the voltage source mode to the current source mode if the duration in which the inverter is in the voltage source mode is greater than or equal to the second threshold.

In an embodiment, the control apparatus is further configured to: when it is detected that the voltage at the first target port jumps, determine whether an interval between a time point at which the inverter switches to the voltage source mode last time and a time point at which the voltage jumps is greater than a fifth threshold; and control the inverter to switch from the current source mode to the voltage source mode if the interval is greater than the fifth threshold.

In an embodiment, the control apparatus is further configured to: control the inverter to skip power output when the inverter is in the voltage source mode and it is detected that a voltage at a second target port is greater than a sixth threshold, where the second target port is a port over which the inverter is connected to the power supply device.

An embodiment of this application further provides a control apparatus. The control apparatus may perform the operations in the foregoing control method. The control apparatus may be a processor, a chip, or a chip system, or a virtual module running in the processor, the chip, or the chip system.

Figure 12:
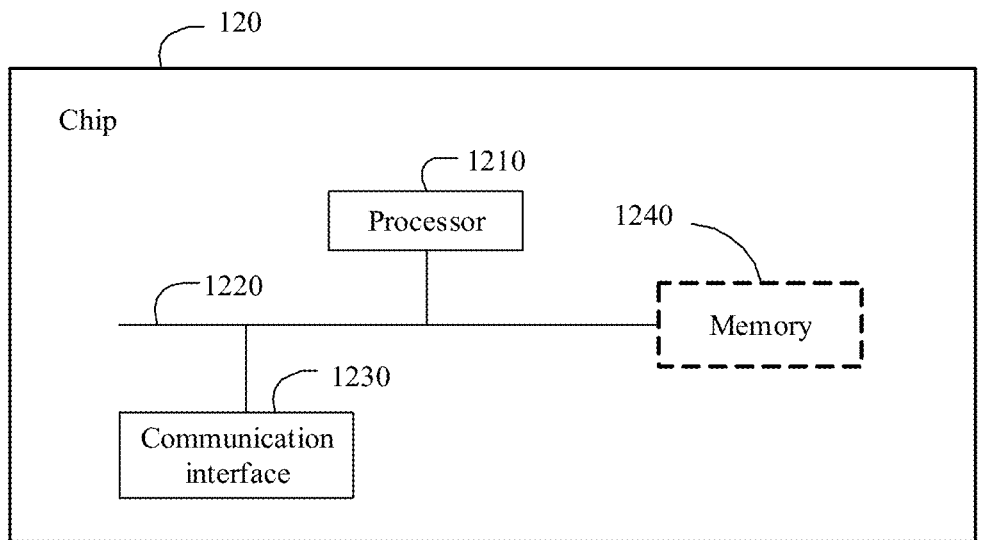
FIG. 12 is a schematic diagram of a structure of a chip according to an embodiment of this application.

For example, the control apparatus is the chip. FIG. 12 is a schematic diagram of a structure of a chip 120 according to an embodiment of this application. The chip 120 includes one or more than two (including two) processors 1210 and a communication interface 1230.

In a possible embodiment, the chip 120 shown in FIG. 12 further includes a memory 1240. The memory 1240 may include a read-only memory and a random access memory and provide operation instructions and data for the processor 1210. A part of the memory 1240 may further include a non-volatile random access memory (NVRAM).

In an embodiment, the memory 1240 stores the following elements: an executable module or data structure, a subset thereof, or an extension set thereof.

In an embodiment of the present disclosure, corresponding operations are performed by invoking the operation instructions stored in the memory 1240 (the operation instructions may be stored in an operating system).

The processor 1210 controls an operation of a terminal device, and the processor 1210 may also be referred to as a central processing unit (CPU). The memory 1240 may include a read-only memory and a random access memory and provide instructions and data for the processor 1210. A part of the memory 1240 may further include a non-volatile random access memory (NVRAM). For example, in application, the memory 1240, the communication interface 1230, and the memory 1240 are coupled to each other through a bus system 1220. The bus system 1220 may further include a power bus, a control bus, a status signal bus, and the like in addition to a data bus. However, for clearer description, various types of buses in FIG. 12 are denoted as the bus system 1220.

The foregoing communication unit may be an interface circuit or a communication interface of the apparatus, and is configured to receive a signal from another apparatus. For example, when the apparatus is implemented as the chip, the communication unit is an interface circuit or a communication interface that is of the chip and that is configured to receive a signal from or send a signal to another chip or apparatus.

The method disclosed in the foregoing embodiments of the present disclosure may be applied to the processor 1210, or may be implemented by using the processor 1210. The processor 1210 may be an integrated circuit chip that has a signal processing capability. an embodiment, the operations in the foregoing method may be implemented by using a hardware integrated logic circuit in the processor 1210 or instructions in a form of software. The foregoing processor 1210 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1210 may implement or perform the methods, operations, and logic block diagrams disclosed in embodiments of the present disclosure. The general-purpose processor may be a microprocessor, or the processor may be any conventional processor or the like. The operations in the method disclosed with reference to embodiments of the present disclosure may be directly presented as being performed and completed by a hardware decoding processor, or performed and completed by a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory 1240, and the processor 1210 reads information in the memory 1240 and completes the operations in the foregoing method in combination with hardware of the processor.

In the foregoing embodiments, the instructions that are stored in the memory and to be executed by the processor may be implemented in a form of a computer program product. The computer program product may be written to the memory in advance, or may be downloaded and installed in the memory as software.

The computer program product includes one or more computer instructions. When the computer program instruction is loaded and executed on a computer, the procedures or functions according to embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, using a coaxial cable, an optical fiber, or a digital subscriber line (DSL)) or wireless (for example, via infrared, radio, or microwaves) manner. The computer-readable storage medium may be any usable medium accessible by computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, solid-state drive, SSD), or the like.

An embodiment of this application further provides a computer-readable storage medium. All or some of the methods described in the foregoing embodiments may be implemented by using software, hardware, firmware, or any combination thereof. If the software is used for the implementation, functions may be stored in the computer-readable medium or transmitted on the computer-readable medium as one or more instructions or code. The computer-readable medium may include a computer storage medium and a communication medium, and may further include any medium that can transfer a computer program from one place to another. The storage medium may be any target medium that can be accessed by a computer.

In an embodiment, the computer-readable medium may include a RAM, a ROM, an EEPROM, a CD-ROM or another compact disc storage, a magnetic disk storage or another magnetic storage device, or any other medium that is used to carry or store required program code in a form of an instruction or a data structure and that can be accessed by a computer. In addition, any connection is appropriately referred to as a computer-readable medium. For example, if a coaxial cable, an optical fiber cable, a twisted pair, a digital subscriber line (DSL), or a wireless technology (for example, infrared, radio, and microwave) is used to transfer software from a website, a server, or another remote source, the coaxial cable, the optical fiber cable, the twisted pair, the DSL, or the wireless technology, for example, infrared, radio, and microwave is covered by a definition of the medium. A magnetic disk and an optical disc used in this specification include a compact disc (CD), a laser disc, an optical disc, a digital versatile disc (DVD), a floppy disk, and a Blu-ray disc. The magnetic disk usually reproduces data magnetically, and the optical disc reproduces data optically by using laser light. The foregoing combinations also need to be included within the scope of the computer-readable medium. The foregoing descriptions are merely implementations of the present disclosure, but are not intended to limit the protection scope of the present disclosure. Any variation or replacement readily figured out by one of ordinary skilled in the art within the technical scope disclosed in the present disclosure shall fall within the protection scope of the present disclosure. Therefore, the protection scope of the present disclosure shall be subject to the protection scope of the claims.

The foregoing descriptions are merely implementations of the present disclosure, but are not intended to limit the protection scope of the present disclosure. Any variation or replacement readily figured out by one of ordinary skilled in the art within the technical scope disclosed in the present disclosure shall fall within the protection scope of the present disclosure. Therefore, the protection scope of the present disclosure shall be subject to the protection scope of the claims.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control method applied to a distributed power system, comprising:

controlling an inverter to work in a current source mode, wherein the current source mode means that the inverter serves as a current source to convert a direct current generated by a power supply device into an alternating current and output the alternating current to an alternating current grid, wherein the distributed power comprises a plurality of distributed power supply units connected to the alternating current grid, wherein each of the distributed power supply units comprises the inverter configured to connect to the power supply device, wherein an input end of the inverter is connected to the power supply device, and wherein an output end of the inverter is connected to the alternating current grid; and controlling the inverter to switch from the current source mode to a voltage source mode when that a voltage at a first target port jumps is detected, wherein the first target port is any of ports over which the inverter is connected to the alternating current grid; and that the voltage jumps means that a change of the voltage at the first target port within first duration is greater than a preset value, and the voltage source mode means that the inverter serves as a voltage source to output a voltage.

2. The method according to claim 1, wherein after the controlling the inverter to switch from the current source mode to the voltage source mode, the method further comprises:

performing islanding detection on the inverter; and shutting down the inverter when that islanding occurs in the inverter is detected.

3. The method according to claim 2, wherein the performing islanding detection on the inverter comprises:

cyclically performing islanding detection on the inverter when duration in which the inverter is in the voltage source mode is less than a second threshold, wherein if it is not detected that islanding occurs in the inverter during islanding detection last time, islanding detection is performed on the inverter again, until islanding occurs in the inverter is detected.

4. The method according to claim 2, wherein the performing islanding detection on the inverter comprises:

tracking a phase change of the voltage at the first target port by using a phase locked loop in the inverter, and injecting positive feedback disturbance into the first target port; and when a frequency of a voltage output by the phase locked loop based on the disturbance is greater than a third threshold, counting once that islanding occurs in the inverter.

5. The method according to claim 4, further comprising:

if a counted quantity of times islanding occurs in the inverter is greater than a fourth threshold, determining that islanding occurs in the inverter is detected.

6. The method according to claim 3, further comprising:

controlling the inverter to switch from the voltage source mode to the current source mode if the duration in which the inverter is in the voltage source mode is greater than or equal to the second threshold.

7. The method according to claim 1, wherein the controlling the inverter to switch from the current source mode to the voltage source mode when that a voltage at the first target port jumps is detected comprises:

when the voltage at the first target port jumps is detected, determining whether an interval between a time point at which the inverter switches to the voltage source mode last time and a time point at which the voltage jumps is greater than a fifth threshold; and controlling the inverter to switch from the current source mode to the voltage source mode if the interval is greater than the fifth threshold.

8. The method according to claim 1, further comprising:

controlling the inverter to skip power output when the inverter is in the voltage source mode and that a voltage at a second target port is greater than a sixth threshold is detected, wherein the second target port is a port over which the inverter is connected to the power supply device.

9. The method according to claim 1, wherein the distributed power system further includes a voltage sampling unit.

10. The method according to claim 9, wherein the voltage sampling unit is disposed in the inverter, or independent of the inverter.

11. A distributed power system, comprising:

a plurality of distributed power supply units connected to an alternating current grid, each of the distributed power supply units comprises an inverter configured to connect to a power supply device, an input end of the inverter is connected to the power supply device, and an output end of the inverter is connected to the alternating current grid;

a control apparatus configured to:

control the inverter to work in a current source mode, in which the inverter serves as a current source to convert a direct current generated by the power supply device into an alternating current and output the alternating current to the alternating current grid; and control the inverter to switch from the current source mode to a voltage source mode when a voltage at a first target port jumps is detected, wherein the first target port is any of ports over which the inverter is connected to the alternating current grid; and that the voltage jumps means that a change of the voltage at the first target port within first duration is greater than a preset value, and the voltage source mode means that the inverter serves as a voltage source to output a voltage.

12. The distributed power system according to claim 11, wherein the control apparatus is further configured to:

perform islanding detection on the inverter; and shut down the inverter when islanding occurs in the inverter is detected.

13. The distributed power system according to claim 12, wherein the control apparatus is configured to:

cyclically perform islanding detection on the inverter when duration in which the inverter is in the voltage source mode is less than a second threshold, wherein if it is not detected that islanding occurs in the inverter during islanding detection last time, islanding detection is performed on the inverter again, until that islanding occurs in the inverter is detected.

14. The distributed power system according to claim 12, wherein the control apparatus is configured to:

track a phase change of the voltage at the first target port by using a phase locked loop in the inverter, and inject positive feedback disturbance into the first target port; and when a frequency of a voltage output by the phase locked loop based on the disturbance is greater than a third threshold, count once that islanding occurs in the inverter.

15. The distributed power system according to claim 14, wherein the control apparatus is configured to:

if a counted quantity of times islanding occurs in the inverter is greater than a fourth threshold, determine that islanding occurs in the inverter is detected.

16. The distributed power system according to claim 13, wherein the control apparatus is further configured to:

control the inverter to switch from the voltage source mode to the current source mode if the duration in which the inverter is in the voltage source mode is greater than or equal to the second threshold.

17. The distributed power system according to claim 11, wherein the control apparatus is further configured to:

when the voltage at the first target port jumps is detected, determine whether an interval between a time point at which the inverter switches to the voltage source mode last time and a time point at which the voltage jumps is greater than a fifth threshold; and control the inverter to switch from the current source mode to the voltage source mode if the interval is greater than the fifth threshold.

18. The distributed power system according to claim 11, wherein the control apparatus is further configured to:

control the inverter to skip power output when the inverter is in the voltage source mode and a voltage at a second target port is greater than a sixth threshold is detected, wherein the second target port is over which the inverter is connected to the power supply device.

19. The distributed power system according to claim 11, wherein the distributed power system further includes a voltage sampling unit.

20. The distributed power system according to claim 19, wherein the voltage sampling unit is disposed in the inverter, or independent of the inverter.

* * * * *